(12) United States Patent
Cheah et al.

(10) Patent No.: US 11,436,610 B2
(45) Date of Patent: Sep. 6, 2022

(54) AUTOMATICALLY CLUSTERING CUSTOMER-SUPPORT REQUESTS TO FORM CUSTOMER-SUPPORT TOPICS

(71) Applicant: Zendesk, Inc., San Francisco, CA (US)

(72) Inventors: Soon-ee Cheah, Bentleigh East (AU); Ai-Lien Tran-Cong, East Melbourne (AU)

(73) Assignee: Zendesk, Inc., San Francisco, CA (US)

( * ) Notice: Subject to any disclaimer, the term of this patent is extended or adjusted under 35 U.S.C. 154(b) by 545 days.

(21) Appl. No.: 16/232,482

(22) Filed: Dec. 26, 2018

(65) Prior Publication Data
US 2019/0130415 A1    May 2, 2019

Related U.S. Application Data

(63) Continuation-in-part of application No. 15/607,318, filed on May 26, 2017, now Pat. No. 10,580,012, (Continued)

(51) Int. Cl.
| | |
|---|---|
| G06Q 30/00 | (2012.01) |
| G06Q 10/00 | (2012.01) |
| G06Q 10/04 | (2012.01) |
| G06Q 30/02 | (2012.01) |
| G06N 3/04 | (2006.01) |
| G06F 16/33 | (2019.01) |
| G06Q 30/06 | (2012.01) |

(Continued)

(52) U.S. Cl.
CPC ....... *G06Q 30/016* (2013.01); *G06F 16/3347* (2019.01); *G06N 3/0445* (2013.01); *G06Q 10/04* (2013.01); *G06Q 10/20* (2013.01); *G06Q 30/0282* (2013.01); *G06Q 30/0631* (2013.01); *G06F 3/0482* (2013.01); *G06Q 10/02* (2013.01)

(58) Field of Classification Search
CPC ................. G06Q 30/016; G06Q 50/04; G06Q 10/06315; G06Q 10/02; G06Q 10/04; G06Q 10/20; G06Q 30/0282; G06Q 30/0631

See application file for complete search history.

(56) References Cited

U.S. PATENT DOCUMENTS

2005/0234879 A1* 10/2005 Zeng .................... G06F 16/3322
2005/0234953 A1* 10/2005 Zhang ................. G06F 16/3346
(Continued)

*Primary Examiner* — Maria C Santos-Diaz
(74) *Attorney, Agent, or Firm* — Park, Vaughan, Fleming & Dowler LLP

(57) ABSTRACT

The system obtains a set of tickets representing customer requests for a customer-support ticketing system. Next, the system produces a set of request vectors by feeding words from each ticket through a model to generate a request vector for the ticket, wherein the set of request vectors is represented as a set of points in a vector space. The system then performs a clustering operation on the set of points to form clusters representing support topics, wherein the clustering operation creates a new point for a new ticket in the vector space when the new ticket is received, and incrementally updates existing clusters to accommodate the new point. Finally, the system presents a user interface to a customer-support agent, wherein the user interface uses the support topics to organize the customer requests, and enables the customer-support agent to perform a customer-support operation in response to a customer request.

24 Claims, 14 Drawing Sheets

Related U.S. Application Data which is a continuation-in-part of application No. 15/087,755, filed on Mar. 31, 2016, now abandoned.

(51) Int. Cl.
*G06F 3/0482* (2013.01)
*G06Q 10/02* (2012.01)

(56) References Cited

U.S. PATENT DOCUMENTS

| | | | |
|---|---|---|---|
| 2007/0208703 A1* | 9/2007 | Shi | G06F 16/951 |
| 2015/0220833 A1* | 8/2015 | Le | G06F 16/583 |
| | | | 706/16 |
| 2016/0012609 A1* | 1/2016 | Laska | G06K 9/00771 |
| | | | 382/103 |
| 2016/0057499 A1* | 2/2016 | Foerster | H04N 21/4758 |
| | | | 705/319 |
| 2016/0328388 A1* | 11/2016 | Cao | G06N 20/00 |
| 2017/0032273 A1* | 2/2017 | Ho | G06N 7/005 |
| 2017/0060366 A1* | 3/2017 | Alexander | G06Q 30/016 |
| 2017/0103329 A1* | 4/2017 | Reddy | G06Q 30/016 |
| 2017/0161279 A1* | 6/2017 | Franceschini | G06F 16/93 |
| 2017/0161619 A1* | 6/2017 | Franceschini | G06N 5/022 |
| 2017/0169475 A1* | 6/2017 | Korpusik | G06Q 30/0269 |
| 2018/0032606 A1* | 2/2018 | Tolman | G06F 16/35 |
| 2018/0096060 A1* | 4/2018 | Peled | G06F 16/35 |

* cited by examiner

| Zendesk ∨ | Add ∨ | Manage Articles > Content Cues | ✱ Help Center |
|---|---|---|---|
| Lists | History | | |
| All Articles | 24 | Content Cues | |
| ▪ Published | 19 | Content Cues identifies gaps in your knowledge base by leveraging Machine Learning. It automatically reviews incoming support tickets from the past 60 days and suggests topics that need to be addressed. | |
| ▪ Drafts | 5 | | |
| ▪ Archived Articles | 0 | Click on one of the topics to find out how you can optimize your content. | |
| Content Cues | 4 | | |

| Support Topic | Number of Tickets | Created |
|---|---|---|
| Get New Flight | 26 | 5 months ago |
| Cancel Flight | 17 | 5 months ago |
| Change Flight | 15 | 5 months ago |
| Add Frequent Flyer Number | 12 | 5 months ago |

FIG. 3

Old Cues 1102

Order confirmation

- I didn't get an order number.
- I'm inquiring into the status of my order.
- I've placed an order but I'm yet to receive confirmation.

New Cues 1104

Never received confirmation email

- I didn't get an order number.
- I've placed an order but I'm yet to receive confirmation.

Did not receive order

- I'm inquiring into the status of my order.

FIG. 11

AUTOMATICALLY CLUSTERING CUSTOMER-SUPPORT REQUESTS TO FORM CUSTOMER-SUPPORT TOPICS

RELATED APPLICATIONS

This application is a continuation-in-part of, and hereby claims priority under 35 U.S.C. § 120 to, pending U.S. patent application Ser. No. 15/607,318, entitled "Article-Suggestion System for Automatically Resolving Customer-Service Requests," by inventors Christopher J. Hausler, et al., filed on 26 May 2017. U.S. patent application Ser. No. 15/607,318 is itself a continuation-in-part of, and claims priority under 35 U.S.C. § 120 to, pending U.S. patent application Ser. No. 15/087,755, entitled "Answer Suggestion System for Automatically Resolving Customer Requests," by inventor Thomas Pelletier, filed on 31 Mar. 2016.

BACKGROUND

Field

The disclosed embodiments generally relate to computer-based systems that help businesses manage customer-service interactions. More specifically, the disclosed embodiments relate to a system that automatically clusters customer-support tickets to form associated customer-support topics.

Related Art

As electronic commerce continues to proliferate, customers are beginning to use online customer-service resources to solve problems, and to obtain information related to various products or services. These online customer-service resources commonly include customer-support ticketing systems, which are designed to help customers resolve their problems, either by providing information to the customers, or by facilitating online interactions with customer-support agents. When designed properly, these online customer-service resources can automate customer-service interactions, thereby significantly reducing a company's customer-service costs.

When handling customer-support tickets and associated conversations, it is useful to be able to associate these tickets with specific customer-support topics. This enables a customer-support system to provide customer-support agents with a bird's eye view of commonly occurring issues, so they can better understand the broad issues that customers have questions about. This information about specific topics also facilitates maintaining relevant self-service help center content.

However, it is almost impossible to determine which specific customer-support topics will arise ahead of time. Hence, it is desirable to be able to form such topics automatically, without knowing beforehand which topics will arise and how many topics will be encountered. Moreover, customer-support topics change over time. This means the customer-support system needs to be able to update the topics as new tickets arrive to account for topics evolving or disappearing, and new topics being created.

Hence, what is needed is a customer-support system that automatically clusters customer-support tickets and associated conversations to form relevant customer-support topics, which can evolve over time.

SUMMARY

The disclosed embodiments relate to a system that automatically clusters customer-support requests to form customer-support topics to facilitate customer-support operations. During operation, the system obtains a set of tickets representing customer requests generated by a customer-support ticketing system, wherein each customer request relates to a product or a service used by a customer. Next, the system produces a set of request vectors for the set of tickets by feeding words from each ticket through a model to generate a request vector for the ticket, wherein the set of request vectors is represented as a set of points in a vector space. The system then performs a clustering operation on the set of points to form clusters representing support topics, wherein the clustering operation is an online clustering operation, which creates a new point in the vector space for a new ticket when the new ticket is received, and incrementally updates existing clusters to accommodate the new point. Finally, the system presents a user interface to a customer-support agent. This user interface uses the support topics to organize the customer requests, and enables the customer-support agent to perform customer-support operations in response to the customer requests.

In some embodiments, for each cluster, the online clustering operation uses a sketch, comprising a subset of N points in the cluster, to represent a boundary of the cluster while determining membership in the cluster.

In some embodiments, upon receiving a new point in the vector space associated with a new ticket, the online clustering operation assigns the new point to a cluster by doing the following. For each cluster, the system determines a distance from the new point to a point farthest away from the new point in the sketch for the cluster. The system then identifies a cluster, which has a closest farthest point from the new point. Next, if the distance between the new point and the farthest point in the identified cluster exceeds a threshold, the system creates a new cluster and assigns the new point to the new cluster. Otherwise, the system assigns the new point to the identified cluster.

In some embodiments, while assigning the new point to the identified cluster, if the new point is farther away from a centroid of the identified cluster than all existing points in the cluster, and the sketch for that cluster already contains the maximum allowable number of points N, the system replaces a closest point to the new point in the sketch of the identified cluster with the new point. On the other hand, if the sketch does not contain the maximum allowable number of points N, the system simply adds the new point to the sketch.

In some embodiments, if a new cluster is created, the system automatically creates a label for the new cluster.

In some embodiments, while generating the request vector for a ticket, the system obtains a set of words from the ticket. Next, the system generates a word vector for each word in the set of words, thereby producing a set of word vectors. The system then feeds the set of word vectors through a recurrent neural network to produce a preliminary request vector representing the ticket. Finally, the system feeds the preliminary request vector through a feed-forward neural network to produce the request vector.

In some embodiments, while obtaining the set of words from the ticket, the system first combines a subject field and a description field from the ticket into a blob of text. Next, the system feeds the blob of text through a regex processor to remove text that does not comprise words to produce a refined blob of text. Finally, the system selects the set of words from the refined blob of text.

In some embodiments, while generating the word vector for each word in the set of words, the system uses the Word2vec technique to generate the word vector for each word.

In some embodiments, the recurrent neural network comprises a long short-term memory (LSTM) network.

In some embodiments, the customer-support operation includes one or more of the following: suggesting a help center article to a customer; creating, editing or deleting help center articles; and configuring a chatbot to facilitate resolving the customer request.

In some embodiments, each customer request includes a question from a customer about a product or a service used by the customer.

BRIEF DESCRIPTION OF THE FIGURES

FIG. 3 illustrates a user interface, which includes content cues representing support topics, in accordance with the disclosed embodiments.

FIG. 11 illustrates how an old content cue can be partitioned into two new content cues in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
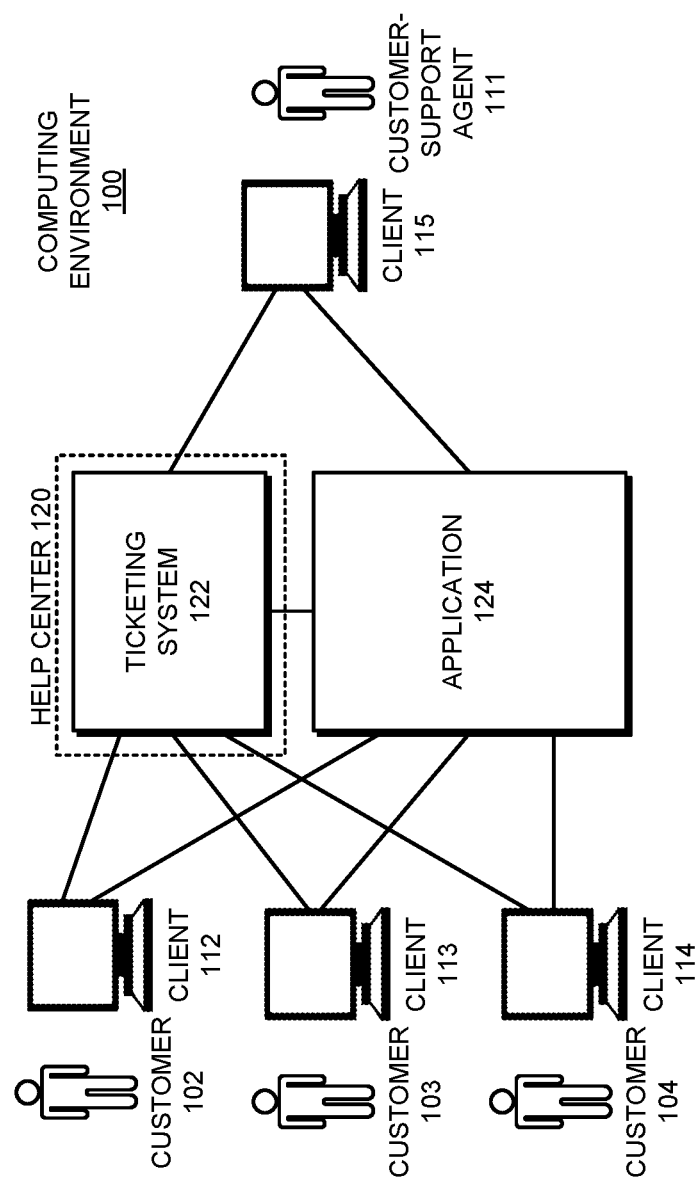
FIG. 1 illustrates a computing environment including an application and associated ticketing system in accordance with the disclosed embodiments.

FIG. 1 illustrates a computing environment 100 including an application 124 and a ticketing system 122 in accordance with the disclosed embodiments. Within computing environment 100, a number of customers 102-104 interact with application 124 through client computer systems 112-114, respectively. Application 124 is provided by an organization, such as a commercial enterprise, to enable customers 102-104 to perform various operations associated with the organization, or to access one or more services provided by the organization. For example, application 124 can include online accounting software that customers 102-104 can access to prepare and file tax returns online. In another example, application 124 provides a commercial website for selling sporting equipment. Note that application 124 can be hosted on a local or remote server.

If customers 102-104 have problems or questions about application 124, they can access a help center 120 to obtain help in dealing with issues, which can include various problems and questions. For example, a user of accounting software may need help in using a feature of the accounting software, or a customer of a website that sells sporting equipment may need help in cancelling an order that was erroneously entered. This help may be provided by a customer-support agent 111 who operates a client computer system 115 and interacts with customers 102-104 through help center 120. This help may also comprise automatically suggested helpful articles that the customer can read to hopefully resolve the problem or question. Note that customer-support agent 111 can access application 124 (either directly or indirectly through help center 120) to help resolve an issue.

In some embodiments, help center 120 is not associated with computer-based application 124, but is instead associated with another type of product or service that is offered to a customer. For example, help center 120 can provide assistance with a product, such as a television, or with a service such as a package-delivery service.

Help center 120 organizes customer issues using a ticketing system 122, which generates tickets to represent each customer issue. Ticketing systems are typically associated with a physical or virtual "help center" (or "help desk") for resolving customer problems. Note that, although the present invention is described with reference to a ticketing system, it is not meant to be limited to customer-service interactions involving ticketing systems. In general, the invention can be applied to any type of system that enables a customer to resolve a problem with a product or service provided by an organization.

Ticketing system 122 comprises a set of software resources that enable a customer to resolve an issue. In the illustrated embodiment, specific customer issues are associated with abstractions called "tickets," which encapsulate various data and metadata associated with the customer requests to resolve an issue. (Within this specification, tickets are more generally referred to as "customer requests.") An exemplary ticket can include a ticket identifier, and information (or links to information) associated with the problem. For example, this information can include: (1) information about the problem; (2) customer information for one or more customers who are affected by the problem; (3) agent information for one or more customer-service agents who are interacting with the customer; (4) email and other electronic communications about the problem (which, for example, can include a question posed by a customer about the problem); (5) information about telephone calls associated with the problem; (6) timeline information associated with customer-service interactions to resolve the problem, including response times and resolution times, such as a first reply time, a time to full resolution and a requester wait time; and (7) effort metrics, such as a number of communications or responses by a customer, a number of times a ticket has been reopened, and a number of times the ticket has been reassigned to a different customer-service agent.

Ticketing System

Figure 2:
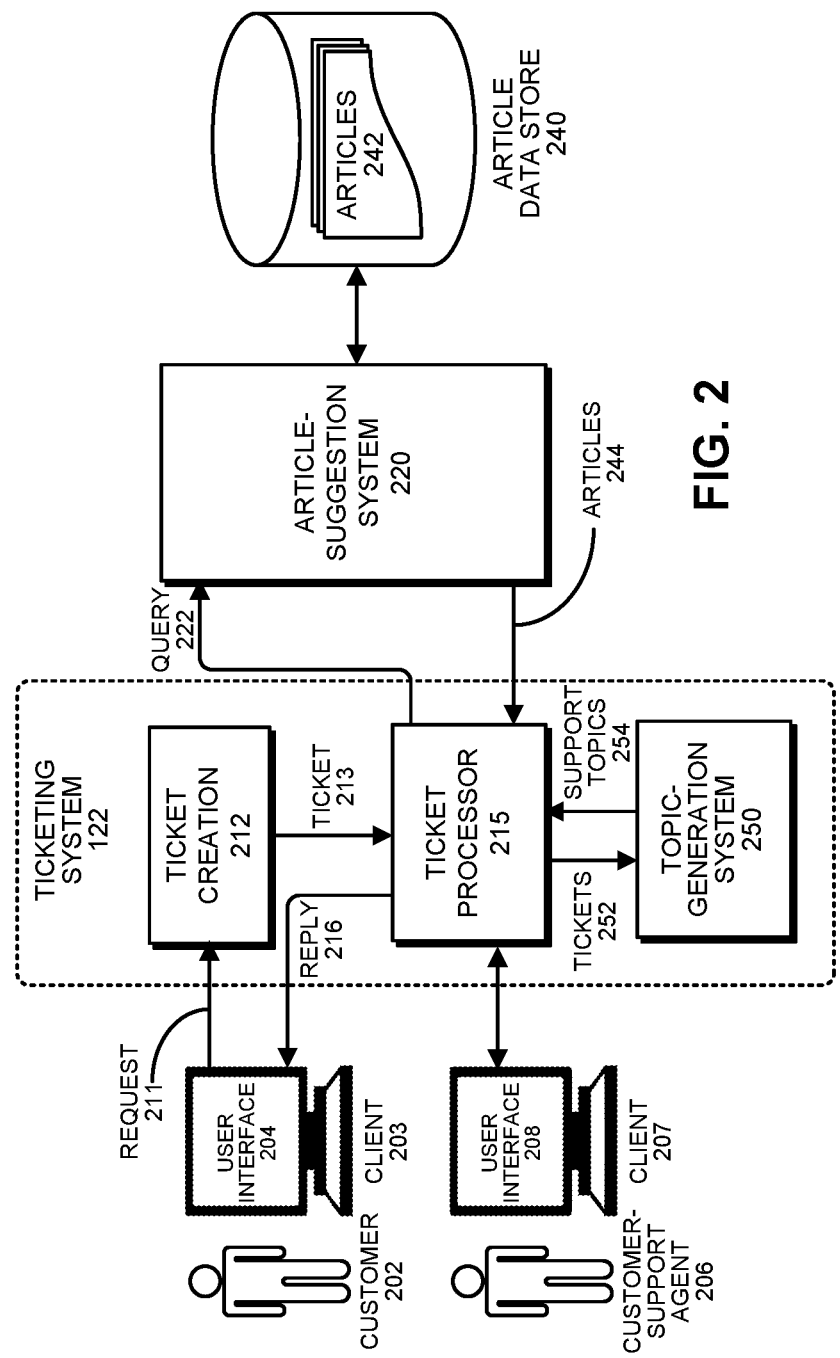
FIG. 2 illustrates processes, which are associated with a ticketing system and an article-suggestion system, in accordance with the disclosed embodiments.

FIG. 2 illustrates a number of processes, which are associated with a ticketing system 122 and an associated article-suggestion system 220 in accordance with the disclosed embodiments. One of the processes starts with a ticket-creation operation 212 that takes place within ticketing system 122. This ticket-creation operation is triggered by actions of a customer 202 operating on a client 203 who has an issue with a product or a service, and submits a request 211 to obtain help with the issue. Note that customer 202 can submit request 211 through a number of possible channels, including through email, online forms, social networking sites, etc. In response to request 211, the ticket-creation operation 212 produces a ticket 213 that feeds into a ticket processor 215.

Next, ticket processor 215 can send a query 222, which is associated with the customer request 211 and the corresponding ticket 213, to an article-suggestion system 220. Then, article-suggestion system 220 obtains a set of suggested articles from a set of help center articles 242 contained in an article data store 240. The identified helpful articles 244 are then returned to suggestion system 220. Next, suggestion system 220 returns the suggested articles 244 to ticket processor 215, which sends a reply 216 containing the suggested articles 244 to a user interface 204 to be displayed to customer 202. Note that user interface 204 can be implemented in a number of different ways for both mobile and desktop platforms. For example, user interface 204 can be incorporated into: a web page, an email, or a UI screen provided by an application.

Ticket processor 215 also feeds tickets 252 into a topic-generation system 250, which generates and returns a list of support topics 254 to ticket processor 215. Ticket processor 215 uses this list of support topics 254 to generate a user interface 208, which is displayed to a customer-support agent 206 through a client 207. Within user interface 208, the support topics 254 are used to organize and display customer requests. User interface 208 also enables the customer-support agent to perform a customer-support operation in response to the customer requests. For example, the customer-support operation can include: suggesting a help center article to a customer; creating, editing or deleting a help center article; or configuring a chatbot to facilitate resolving the customer request.

Content Cues for Customer-Support Topics

As mentioned previously, ticketing system 122 facilitates conversations between customers and customer-support agents. During this process, ticketing system 122 organizes the conversations under automatically generated support topics and provides customer-support agents with associated "content cues," which summarize the support topics. This provides the customer-support agents with a bird's eye view of the topics their customers have questions about. They can use this content cue information to provide a framework for organizing the customer-support topics, and to maintain relevant self-service content. (Note that this maintenance can involve creating, editing or deleting articles in order to maintain relevant help center content.) For example, FIG. 3 illustrates a user interface for an airline reservation system, which provides a view that includes content cues representing support topics associated with specific operations, such as "get new flight," "cancel flight," "change flight" and "add frequent flier number." Clicking into each of these topics provides more information about the topic.

Figure 4:
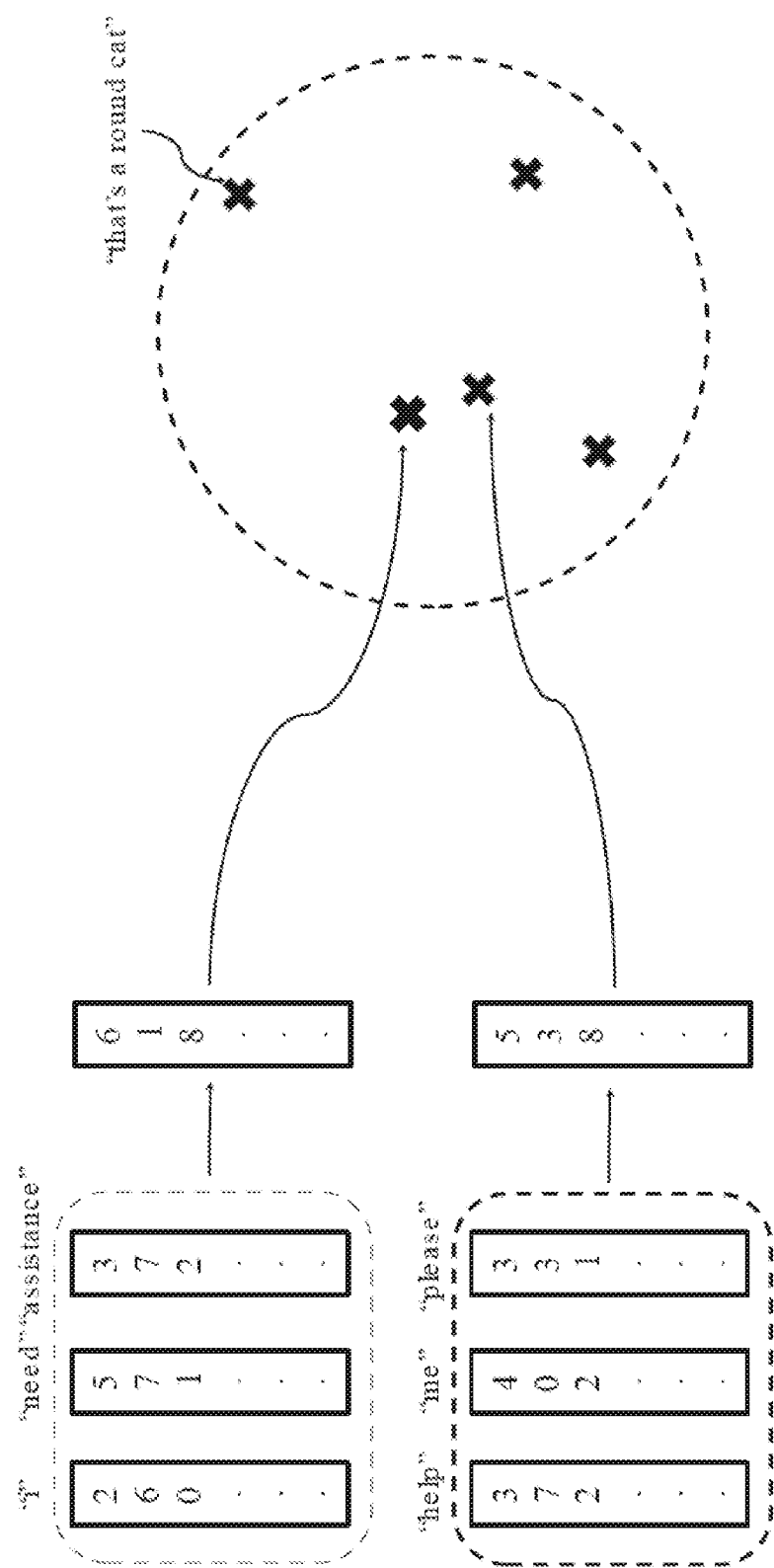
FIG. 4 illustrates how tickets are represented with corresponding vectors in accordance with the disclosed embodiments.

One challenge in providing these content cues is to identify associated support topics from customer tickets. Fortunately, support topics can be identified by using machine-learning techniques to cluster customer tickets. In some embodiments, an LSTM network is used to create dense representations of the semantic content of text obtained from tickets. This LSTM network encodes text into a numerical representation that contains information about its meaning. For example, FIG. 4 illustrates how words obtained from tickets are encoded using vectors, and how individual word vectors are used to create a "final vector" for each ticket, which contains information about the meaning of the collection of individual words in a ticket. These final vectors are located in a vector space such that their distance and semantic-relatedness are correlated, that is, tickets that are associated with related topics are close together, even if they are expressed using different words, such as "can you help" or "help me please." In contrast, tickets that are located farther away from each other in the vector space are associated with completely different topics.

The clustering technique employed to group these vectors is constrained by several requirements. First, the clustering technique must be able to determine the number of clusters in the absence of prior knowledge or user input. Second, the clustering technique must allow the vector space to be updated continually as new tickets arrive and associated topics evolve or disappear, and new topics are created. This means that common clustering techniques, such as k-means clustering or agglomerative clustering, cannot be used.

Figure 5:
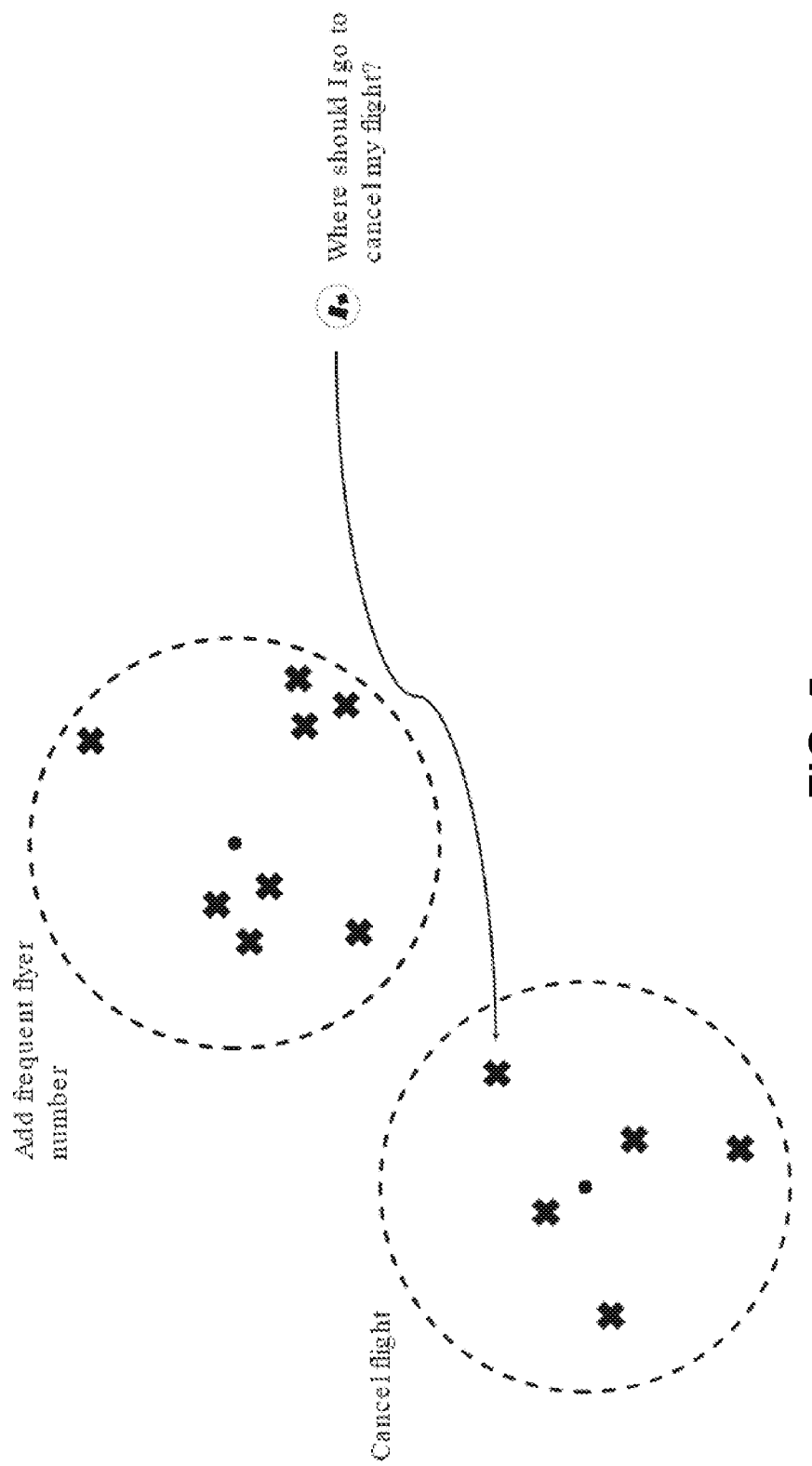
FIG. 5 illustrates how tickets are clustered to identify content cues in accordance with the disclosed embodiments.

Our clustering technique introduces tickets one at a time and groups them with nearby tickets in the vector space. Referring to the example vector space illustrated in FIG. 5, suppose we receive a new ticket associated with the question "Where should I go to cancel my flight?" We decide which cluster the new ticket belongs to based on distances between the new ticket and the cluster centroids, and then assign the new ticket to that cluster. In the example illustrated in FIG. 5, the new ticket is closer to the group of tickets associated with "cancel flight" than it is to the tickets associated with "add frequent flyer number," so the new ticket is added to the "cancel flight" cluster.

Figure 6:
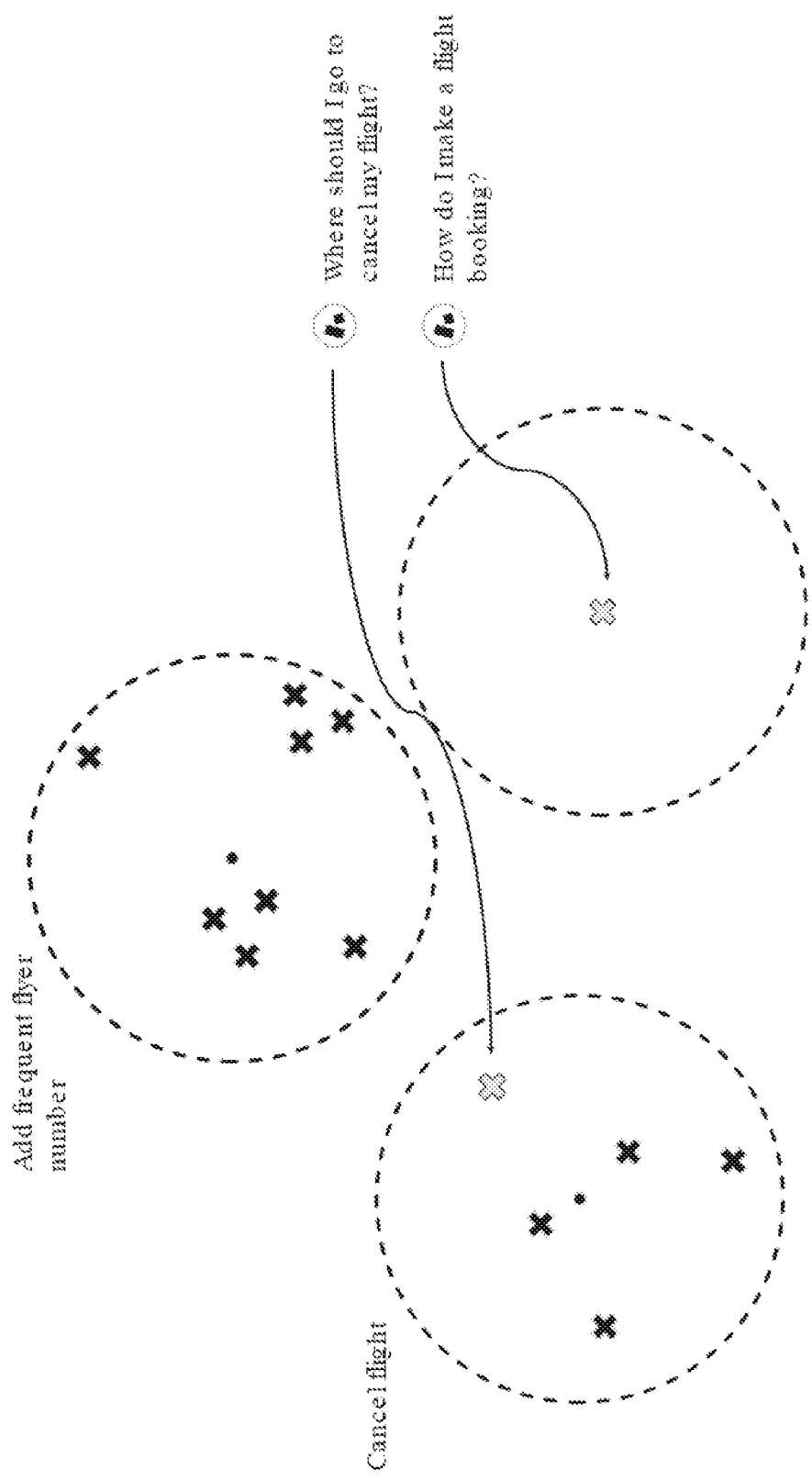
FIG. 6 illustrates how a ticket that is unrelated to an existing content cue is used to form a new content cue in accordance with the disclosed embodiments.

In contrast, suppose we receive a new ticket associated with the question "How do I make a flight booking?" as is illustrated in FIG. 6. This new ticket is not related to tickets we have seen before, so we start a new cluster with that ticket. More specifically, for each existing cluster, the system determines a distance from a new point in the vector space associated with the new ticket to a point farthest away from the new point in the sketch for the cluster. The system then identifies a cluster, which has a closest farthest point from the new point. Next, if the distance between the new point and the farthest point in the identified cluster exceeds a predetermined threshold, the system creates a new cluster and assigns the new point to the new cluster. Otherwise, the system assigns the new point to the identified cluster.

Figure 7:
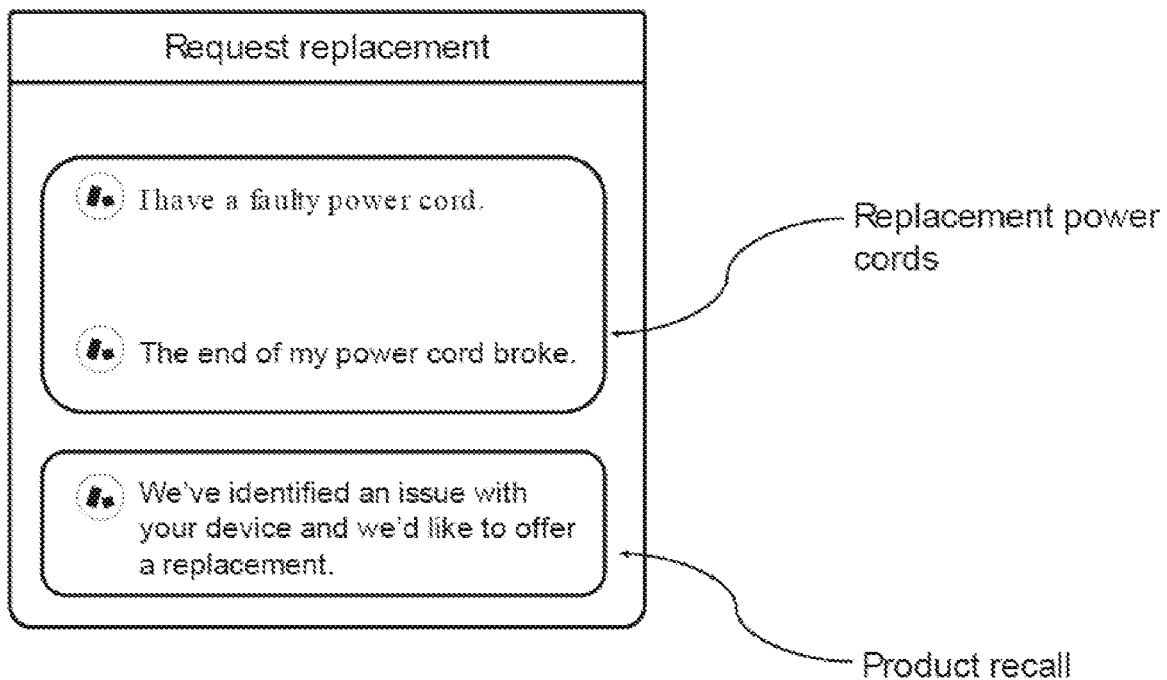
FIG. 7 illustrates a content cue for a customer who sells electronic devices in accordance with the disclosed embodiments.

FIG. 7 illustrates a content cue labeled "Request replacement" for a customer who sells electronic devices. This content cue is associated with three different tickets: (1) "I have a faulty power cord;" (2) "The end of my power cord broke;" and (3) "We've identified an issue with your device and we'd like to offer a replacement." Note that these three tickets are associated with two distinct problems, namely "replacement power cords" and "product recall," which need to be dealt with using different actions and different self-service articles. Hence, the single content cue "Request replacement" is too general because it encompasses two distinct problems.

Figure 8:
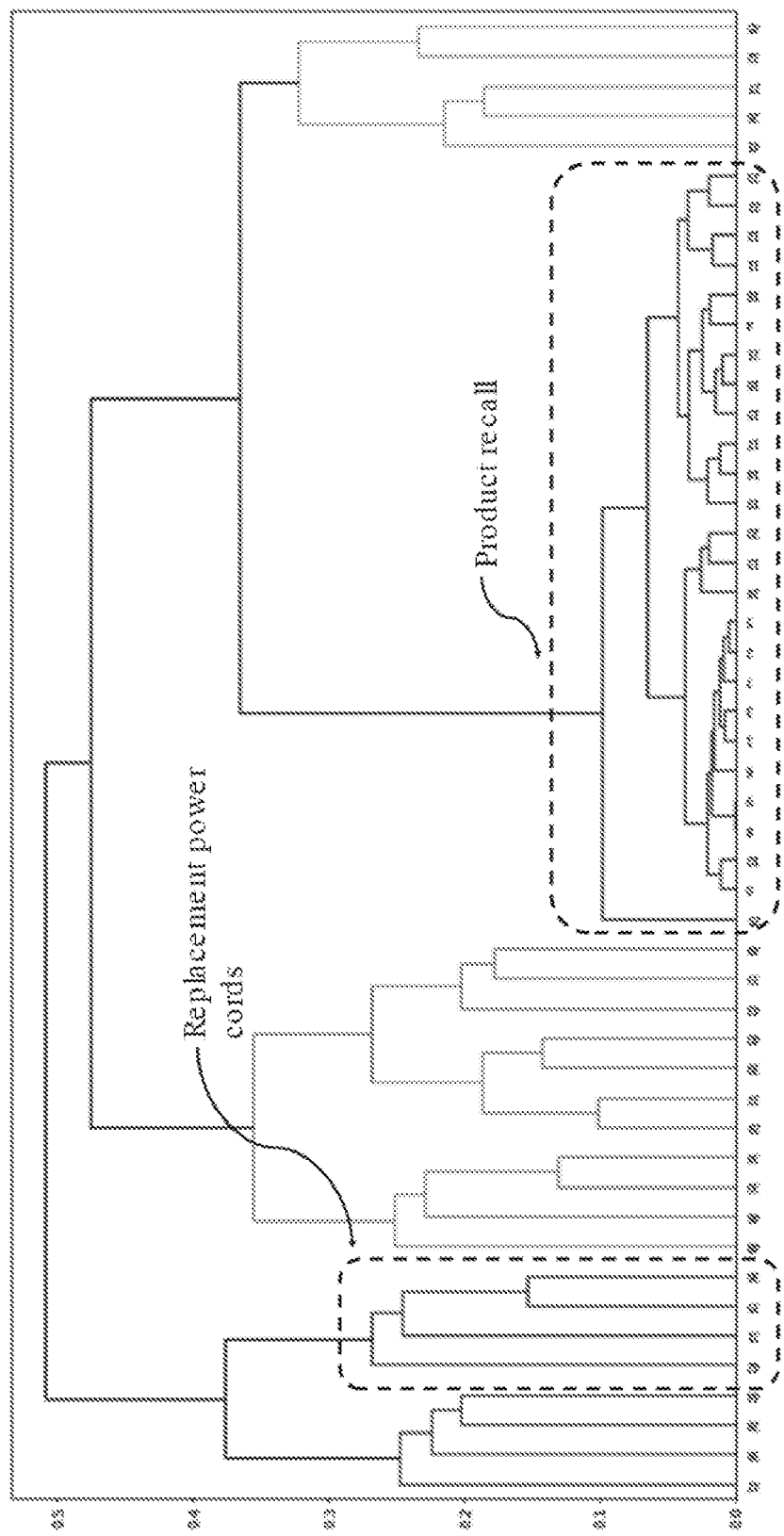
FIG. 8 illustrates a dendrogram representing an agglomerative clustering of support tickets based on complete-linkage clustering in accordance with the disclosed embodiments.

To deal with this problem, we examined tickets in the cluster associated with the "Request replacement" content cue by creating a dendrogram representing the agglomerative clustering of the tickets using complete-linkage clustering as is illustrated in FIG. 8. In this representation, the tickets are associated with integers, and each connection shows where they are joined and the associated distance between the tickets. As illustrated in the dendrogram in FIG. 8, we uncovered structure within this cluster using agglomerative complete-linkage clustering to identify distinct subtopics within the cluster. This is a potential solution to the problem of producing content cues that are too general. However, it presents additional challenges because we cannot perform agglomerative clustering or complete-linkage clustering in a streaming setting. But why does complete-linkage work, but not average-linkage clustering? The intuition for this is that complete-linkage creates more compact clusters that limit drift and chaining.

Figure 9A:
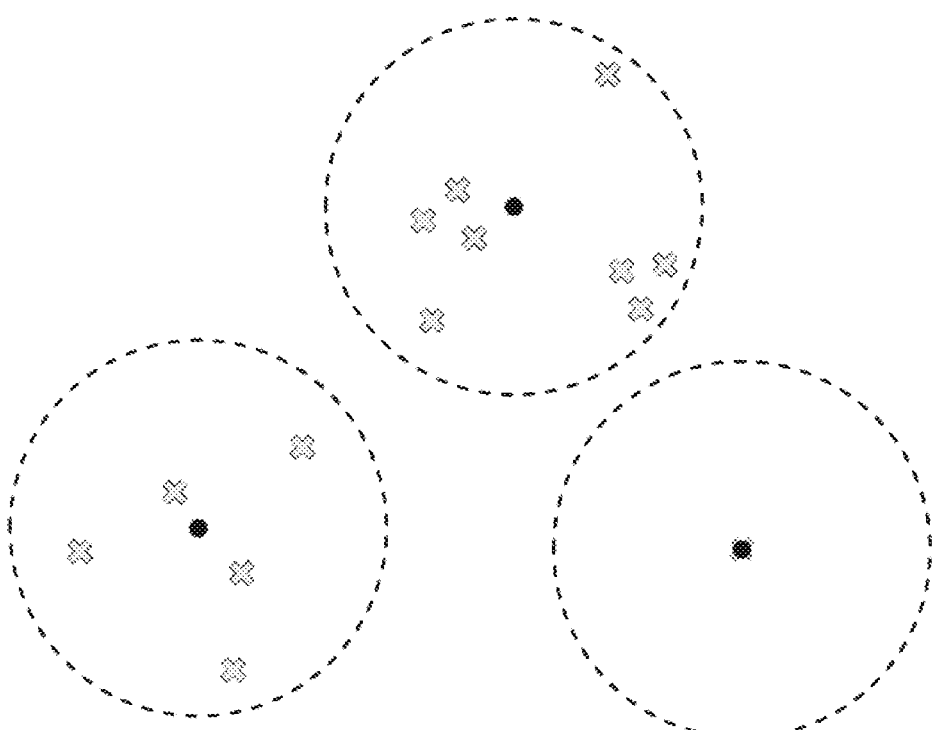
FIG. 9A illustrates an exemplary clustering of a set of support tickets in accordance with the disclosed embodiments.

Going back to our original clusters, which are illustrated in FIG. 9A, note that we only keep track of the centroids of the clusters to ensure that our clustering space only grows as a fraction of the total number of tickets that we see. However, to perform complete-linkage assignment of new tickets, we need to know the distance between the incoming ticket and the most dissimilar ticket in each cluster, which requires knowledge of the cluster members.

Figure 9B:
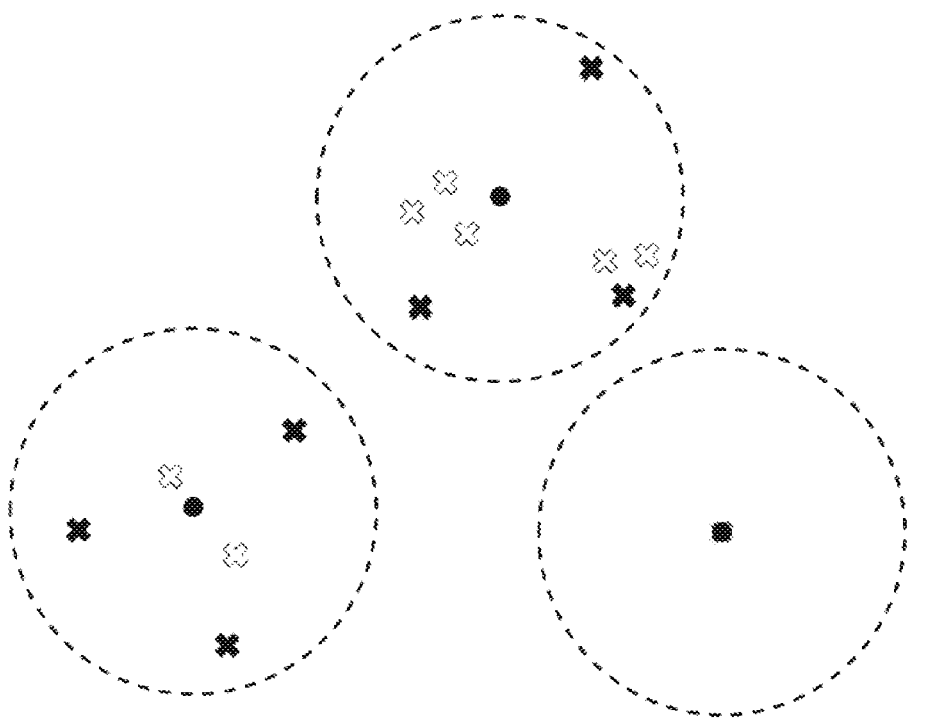
FIG. 9B illustrates corresponding boundary sketches for the exemplary clustering in accordance with the disclosed embodiments.
Figure 10:
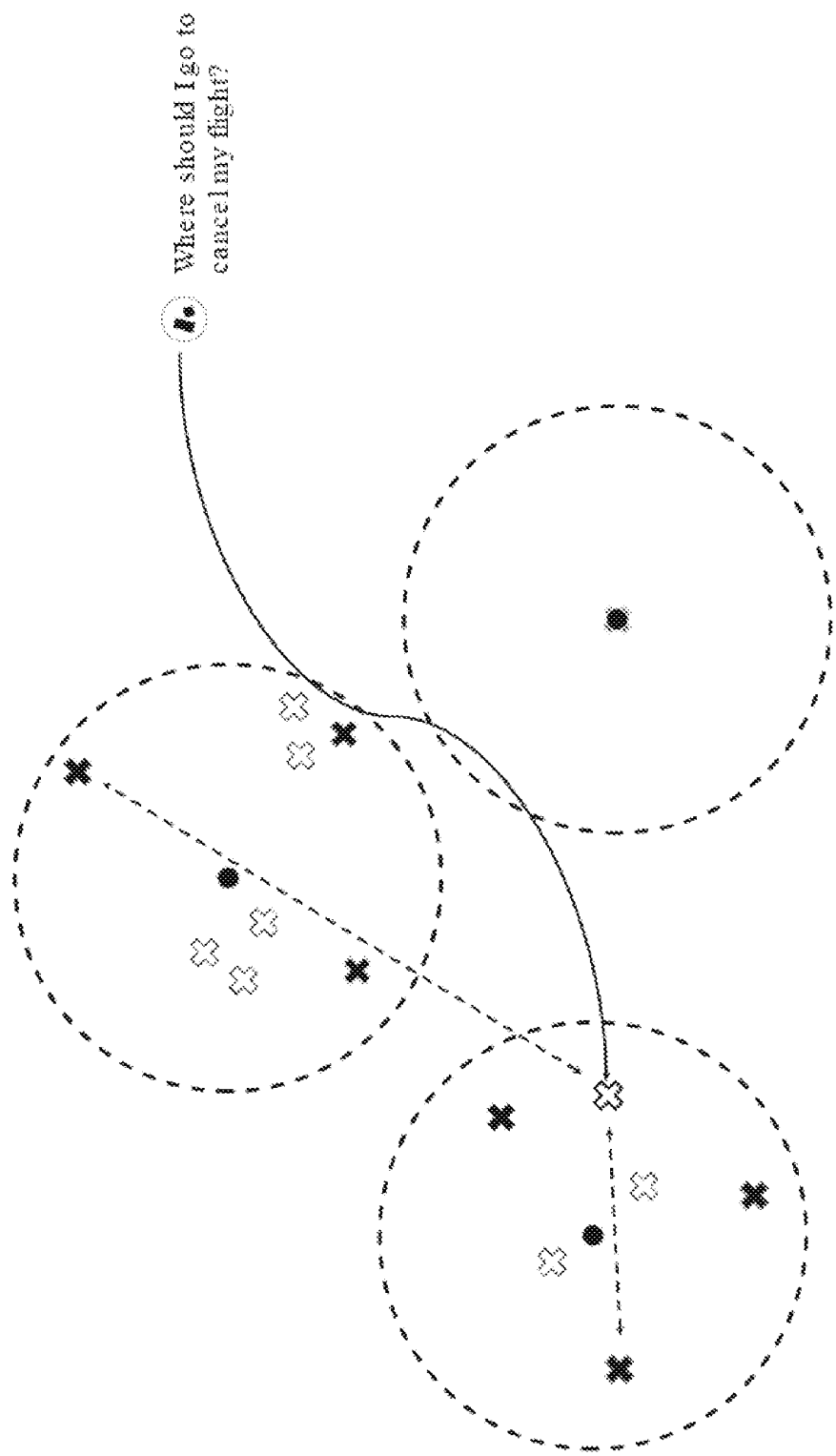
FIG. 10 illustrates the process for assigning a new ticket to a cluster in accordance with the disclosed embodiments.

To remedy this problem, we keep track of a "sketch" comprising a subset of the boundary points for each cluster as is illustrated in FIG. 9B. (In the example illustrated in FIG. 9B, the sketch comprises three points. However, the optimal number of points to include in each sketch can be tuned for different application domains and different compute-cost tradeoffs.) This sketch provides an approximation of the boundaries of the cluster, which enables us to efficiently approximate a complete-linkage clustering strategy. Hence, instead of maintaining a radius around each centroid, which is effectively what average-linkage clustering does, we determine cluster assignments based on the distance to the points in the sketch. New tickets get assigned to clusters based on their distance to the most dissimilar ticket in each cluster's sketch as is illustrated in FIG. 10. However, this distance stills need to be less than the threshold distance. Otherwise, a new cluster is created.

Note that this technique effectively produces more numerous clusters that succeed in splitting apart distinct topics. This is illustrated in FIG. 11, which illustrates a set of old cues 1102 and a set of new cues 1104. The old cues 1102 include a single cue for "Order confirmation," whereas the new cues 1104 contain two more-detailed cues for the same tickets, namely "Never received confirmation email" and "Did not receive order."

Process for Automatically Forming Support Topics

Figure 12:
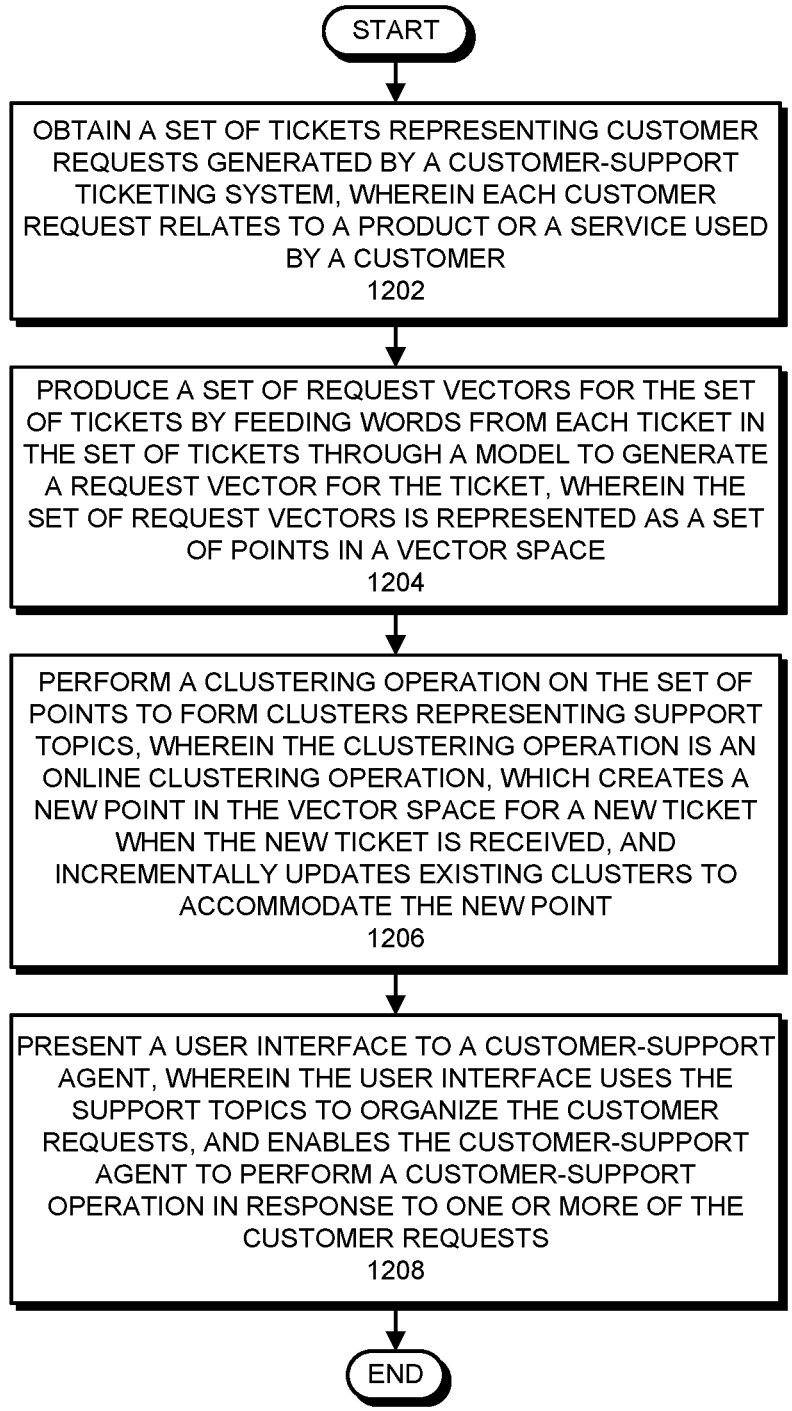
FIG. 12 presents a flowchart illustrating the process of automatically generating support topics from tickets in accordance with the disclosed embodiments.

FIG. 12 presents a flowchart illustrating a process for automatically generating support topics from tickets in accordance with the disclosed embodiments. During operation, the system obtains a set of tickets representing customer requests generated by a customer-support ticketing system, wherein each customer request relates to a product or a service used by a customer (step 1202). Next, the system produces a set of request vectors for the set of tickets by feeding words from each ticket in the set of tickets through a model to generate a request vector for the ticket, wherein the set of request vectors is represented as a set of points in a vector space (step 1204). The system then performs a clustering operation on the set of points to form clusters representing support topics, wherein the clustering operation is an online clustering operation, which creates a new point in the vector space for a new ticket when the new ticket is received, and incrementally updates existing clusters to accommodate the new point (step 1206). Finally, the system presents a user interface to a customer-support agent, wherein the user interface uses the support topics to organize the customer requests, and enables the customer-support agent to perform a customer-support operation in response to one or more of the customer requests (step 1208).

Figure 13:
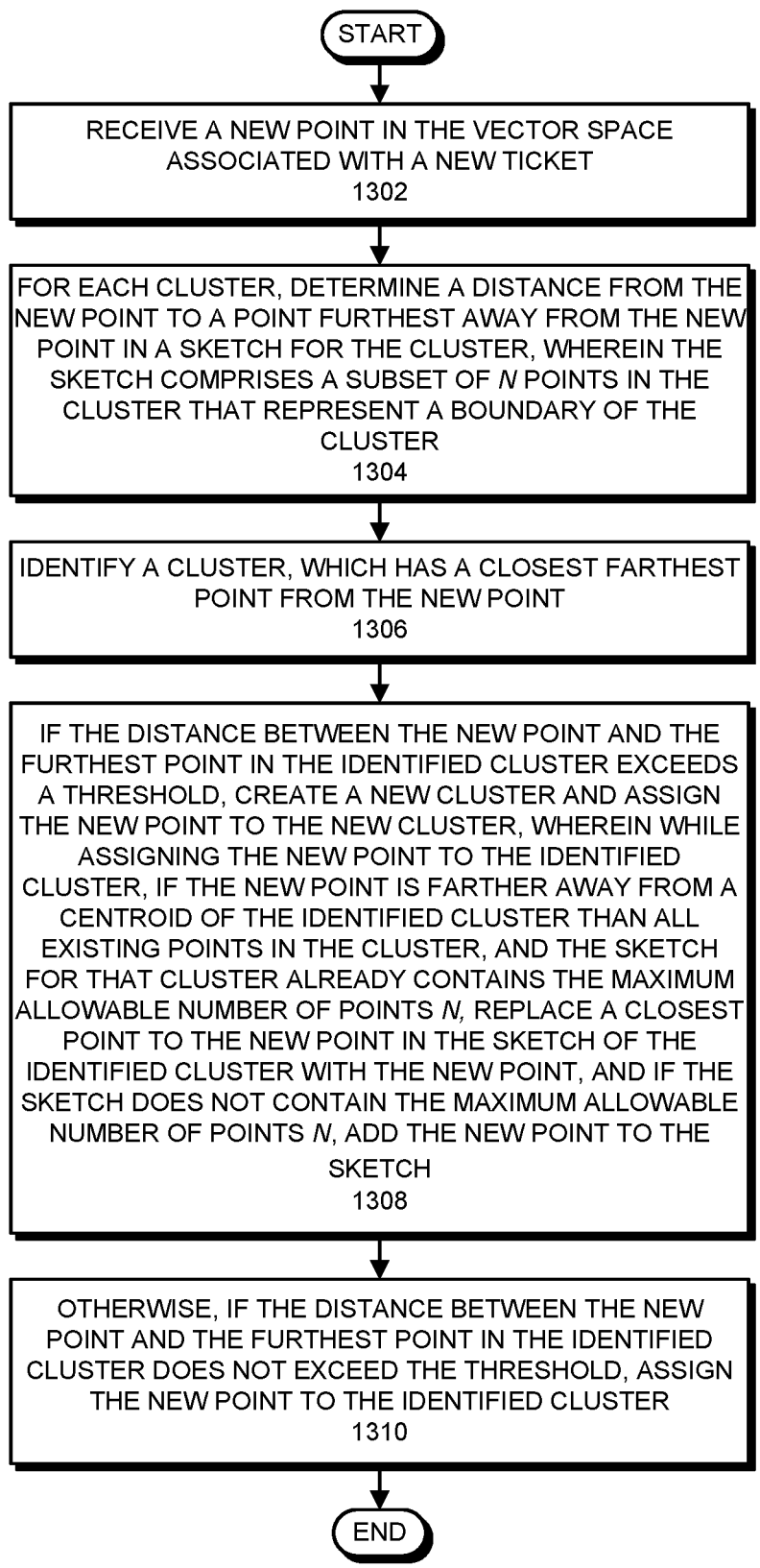
FIG. 13 presents a flowchart illustrating the process of assigning a new point, which is associated with a new ticket, to a cluster in accordance with the disclosed embodiments.

FIG. 13 presents a flowchart illustrating the process of assigning a new point, which is associated with a new ticket, to a cluster in accordance with the disclosed embodiments. The system first receives a new point in the vector space associated with a new ticket (step 1302). Next, for each cluster, the system determines a distance from the new point to a point farthest away from the new point in the sketch for the cluster, wherein the sketch comprises a subset of N points in the cluster that represent a boundary of the cluster (step 1304). The system then identifies a cluster, which has a closest farthest point from the new point (step 1306). Next, if the distance between the new point and the farthest point in the identified cluster exceeds a threshold, the system creates a new cluster and assigns the new point to the new cluster, wherein while assigning the new point to the identified cluster, if the new point is farther away from a centroid of the identified cluster than all existing points in the cluster, and the sketch for that cluster already contains the maximum allowable number of points N, the system replaces a closest point to the new point in the sketch of the identified cluster with the new point, and if the sketch does not contain the maximum allowable number of points N, the system adds the new point to the sketch (step 1308). Otherwise, if the distance between the new point and the farthest point in the identified cluster does not exceed the threshold, the system assigns the new point to the identified cluster (step 1310).

Figure 14:
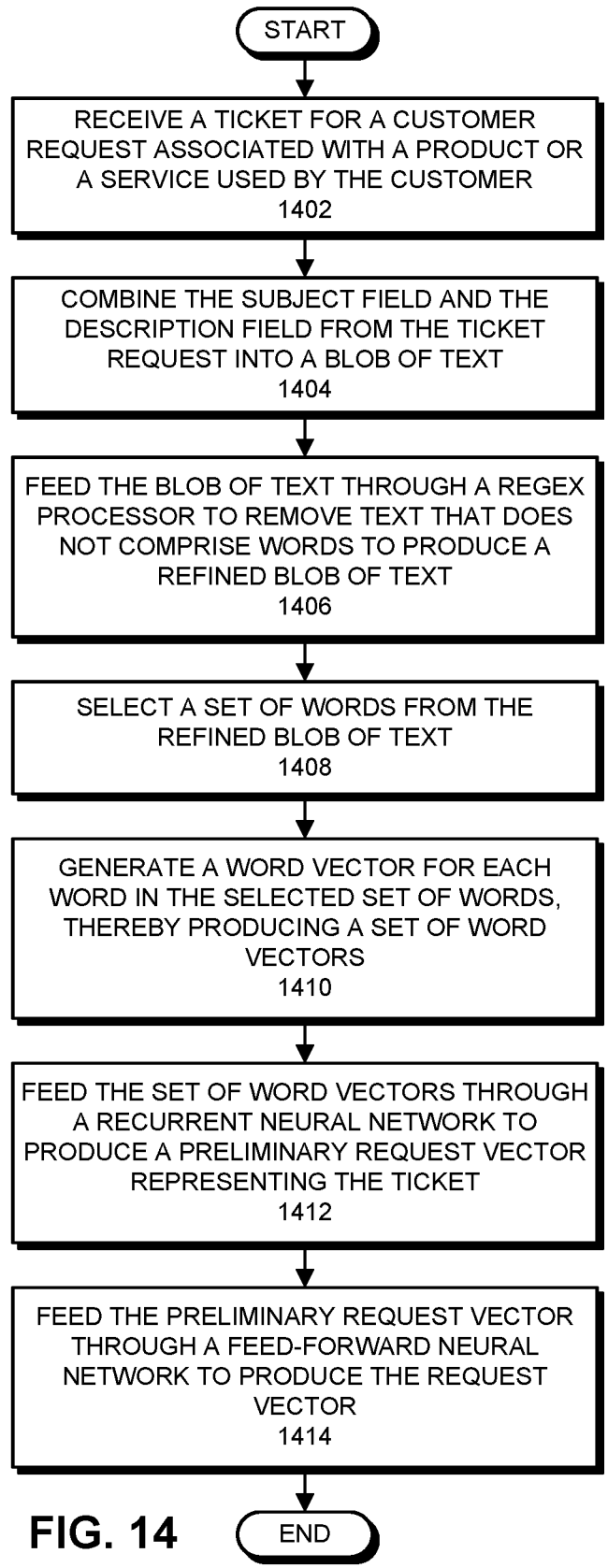
FIG. 14 presents a flowchart illustrating the process of generating a request vector from a ticket in accordance with the disclosed embodiments.

FIG. 14 presents a flowchart illustrating the process of generating a request vector from a ticket in accordance with the disclosed embodiments. The system first receives a ticket for a customer request associated with a product or service used by the customer (step 1402). The system then combines a subject field and a description field from the ticket into a blob of text (step 1404). Next, the system feeds the blob of text through a regex processor to remove text that does not comprise words to produce a refined blob of text (step 1406). The system then selects the set of words from the refined blob of text (step 1408). Next, the system generates a word vector for each word in the set of words, thereby producing a set of word vectors (step 1410). The system then feeds the set of word vectors through a recurrent neural network to produce a preliminary request vector representing the ticket (step 1412). Finally, the system feeds the preliminary request vector through a feed-forward neural network to produce the request vector (step 1414).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for automatically categorizing customer-support requests to form customer-support topics to facilitate customer-support operations, the method comprising:
   obtaining a set of tickets representing customer requests generated by a customer-support ticketing system;
   producing a set of request vectors for the set of tickets by, for each ticket in the set of tickets:
      feeding words from the ticket through a model to generate a request vector for the ticket;
      wherein the request vector is represented as a point in a vector space;
   performing a clustering operation on the points to form clusters wherein each cluster represents a support topic encompassing the tickets from which points in the cluster were produced;
   for each cluster, selecting multiple points in the cluster to define a corresponding sketch of a boundary of the cluster, wherein the multiple points are the furthest points from a centroid of the cluster; and
   presenting a user interface to a customer-support agent, wherein the user interface organizes the customer requests according to the support topics, and wherein the user interface enables the customer-support agent to perform a customer-support operation in response to one or more of the customer requests.

2. The method of claim 1, wherein upon receiving a new point in the vector space associated with a new ticket, the clustering operation assigns the new point to a cluster by:
   for each cluster:
      selecting a point in the corresponding sketch that is furthest from the new point; and
      determining a distance between the selected point and the new point;
   identifying the cluster whose selected point is closest to the new point;
   if the distance between the new point and the selected point in the identified cluster exceeds a threshold, creating a new cluster and assigning the new point to the new cluster; and
   otherwise, assigning the new point to the identified cluster.

3. The method of claim 2, wherein assigning the new point to the identified cluster comprises:
   when the new point is further from the centroid of the identified cluster than all existing points in the corresponding sketch for the identified cluster:
      if the corresponding sketch contains a maximum allowable number of points N, replacing a closest point to the new point in the corresponding sketch with the new point; and
      if the corresponding sketch does not contain the maximum allowable number of points N adding the new point to the corresponding sketch.

4. The method of claim 2, wherein if a new cluster is created, the method further comprises automatically creating a label for the new cluster.

5. The method of claim 1, wherein generating a request vector for a ticket involves:
   obtaining a set of words from the ticket;
   generating a word vector for each word in the set of words, thereby producing a set of word vectors;
   feeding the set of word vectors through a recurrent neural network to produce a preliminary request vector representing the ticket; and
   feeding the preliminary request vector through a feed-forward neural network to produce the request vector.

6. The method of claim 5, wherein obtaining the set of words from the ticket involves:
   combining a subject field and a description field from the ticket into a blob of text;
   feeding the blob of text through a regex processor to remove text that does not comprise words to produce a refined blob of text; and
   selecting the set of words from the refined blob of text.

7. The method of claim 5, wherein generating the word vector for each word in the set of words involves using the Word2vec technique to generate the word vector for each word.

8. The method of claim 5, wherein the recurrent neural network comprises a long short-term memory (LSTM) network.

9. The method of claim 1, wherein the customer-support operation includes one or more of the following:
   suggesting a help center article to a customer;
   creating, editing or deleting help center articles; and
   configuring a chatbot to facilitate resolving the customer request.

10. The method of claim 1, wherein each customer request includes a question from a customer about a product or a service used by the customer.

11. A non-transitory computer-readable storage medium storing instructions that when executed by a computer cause the computer to perform a method for automatically categorizing customer-support requests to form customer-support topics to facilitate customer-support operations, the method comprising:
obtaining a set of tickets representing customer requests generated by a customer-support ticketing system;
producing a set of request vectors for the set of tickets by, for each ticket in the set of tickets:
feeding words from the ticket through a model to generate a request vector for the ticket;
wherein the request vector is represented as a point in a vector space;
performing a clustering operation on the points to form clusters, wherein each cluster represents a support topic encompassing the tickets from which points in the cluster were produced;
for each cluster, selecting multiple points in the cluster to define a corresponding sketch of a boundary of the cluster, wherein the multiple points are the furthest points from a centroid of the cluster; and
presenting a user interface to a customer-support agent, wherein the user interface organizes the customer requests according to the support topics, and wherein the user interface enables the customer-support agent to perform a customer-support operation in response to one or more of the customer requests.

12. The non-transitory computer-readable storage medium of claim 11, wherein upon receiving a new point in the vector space associated with a new ticket, the clustering operation assigns the new point to a cluster by:
for each cluster:
selecting a point in the corresponding sketch that is furthest from the new point; and
determining a distance between the selected point and the new point;
identifying the cluster whose selected point is closest to the new point;
if the distance between the new point and the selected point in the identified cluster exceeds a threshold, creating a new cluster and assigning the new point to the new cluster; and
otherwise, assigning the new point to the identified cluster.

13. The non-transitory computer-readable storage medium of claim 12, wherein assigning the new point to the identified cluster comprises:
when the new point is further from the centroid of the identified cluster than all existing points in the corresponding sketch for the identified cluster:
if the corresponding sketch contains a maximum allowable number of points N, replacing a closest point to the new point in the corresponding sketch with the new point; and
if the corresponding sketch does not contain the maximum allowable number of points N, adding the new point to the corresponding sketch.

14. The non-transitory computer-readable storage medium of claim 12, wherein if a new cluster is created, the method further comprises automatically creating a label for the new cluster.

15. The non-transitory computer-readable storage medium of claim 11, wherein generating a request vector for a ticket involves:
obtaining a set of words from the ticket;
generating a word vector for each word in the set of words, thereby producing a set of word vectors;
feeding the set of word vectors through a recurrent neural network to produce a preliminary request vector representing the ticket; and
feeding the preliminary request vector through a feed-forward neural network to produce the request vector.

16. The non-transitory computer-readable storage medium of claim 15, wherein obtaining the set of words from the ticket involves:
combining a subject field and a description field from the ticket into a blob of text;
feeding the blob of text through a regex processor to remove text that does not comprise words to produce a refined blob of text; and
selecting the set of words from the refined blob of text.

17. The non-transitory computer-readable storage medium of claim 15, wherein generating the word vector for each word in the set of words involves using the Word2vec technique to generate the word vector for each word.

18. The non-transitory computer-readable storage medium of claim 15, wherein the recurrent neural network comprises a long short-term memory (LSTM) network.

19. The non-transitory computer-readable storage medium of claim 15, wherein the customer-support operation includes one or more of the following:
suggesting a help center article to a customer;
creating, editing or deleting help center articles; and
configuring a chatbot to facilitate resolving the customer request.

20. The non-transitory computer-readable storage medium of claim 15, wherein each customer request includes a question from a customer about a product or a service used by the customer.

21. A system that automatically categorizes customer-support requests to form customer-support topics to facilitate customer-support operations, the system comprising:
at least one processor and at least one associated memory; and
a customer-support ticketing system, which executes on the at least one processor, wherein during operation, the customer-support ticketing system:
obtains a set of tickets representing customer requests generated by a customer-support ticketing system;
produces a set of request vectors for the set of tickets by, for each ticket in the set of tickets:
feeding words from the ticket through a model to generate a request vector for the ticket;
wherein the request vector is represented as a point in a vector space;
performs a clustering operation on the points to form clusters, wherein each cluster represents a support topic encompassing the tickets from which points in the cluster were produced;
for each cluster, selects multiple points in the cluster to define a corresponding sketch of a boundary of the cluster, wherein the multiple points are the furthest points from a centroid of the cluster; and
presents a user interface to a customer-support agent, wherein the user interface organizes the customer requests according to the support topics, and wherein the user interface enables the customer-support agent to perform a customer-support operation in response to one or more of the customer requests.

22. The system of claim 21, wherein upon receiving a new point in the vector space associated with a new ticket, the clustering operation assigns the new point to a cluster by:
for each cluster:
selecting a point in the corresponding sketch that is furthest from the new point; and
determining a distance between the selected point and the new point;
identifying the cluster whose selected point is closest to the new point;
if the distance between the new point and the selected point in the identified cluster exceeds a threshold, creating a new cluster and assigning the new point to the new cluster; and
otherwise, assigning the new point to the identified cluster.

23. The system of claim 22, wherein assigning the new point to the identified cluster comprises:
when the new point is further from the centroid of the identified cluster than all existing points in the corresponding sketch for the identified cluster:
if the corresponding sketch contains a maximum allowable number of points N, replacing a closest point to the new point in the corresponding sketch with the new point; and
if the corresponding sketch does not contain the maximum allowable number of points N, adding the new point to the corresponding sketch.

24. The system of claim 22, wherein if a new cluster is created, the online clustering operation automatically creates a label for the new cluster.

* * * * *